United States Patent
Zimmermann et al.

[11] Patent Number: 5,942,268
[45] Date of Patent: Aug. 24, 1999

[54] EMBOSSED SHAPE FOOD ITEM

[75] Inventors: Craig E. Zimmermann, Waconia; Julie L. Holmstrom, Savage; Richard O. Benham, New Hope, all of Minn.

[73] Assignee: General Mills, Inc., Minneapolis, Minn.

[21] Appl. No.: 09/206,714

[22] Filed: Dec. 7, 1998

Related U.S. Application Data

[62] Division of application No. 09/144,620, Aug. 31, 1998, Pat. No. 5,876,777, which is a division of application No. 08/835,985, Apr. 14, 1997, Pat. No. 5,846,588.

[51] Int. Cl.⁶ .................................................. A23P 1/00
[52] U.S. Cl. .......................... 426/132; 426/104; 426/115; 426/125
[58] Field of Search ................................. 426/104, 106, 426/115, 125, 132, 414, 420, 415, 512, 517, 410, 144; 425/102, 373, 366; 99/450.1, 353; 53/122, 428, 453, 559, 514, 435, 154, 155, 237, 238, 454, 560

[56] References Cited

U.S. PATENT DOCUMENTS

| | | | |
|---|---|---|---|
| D. 218,726 | 9/1970 | La Mothe et al. | D1/120 |
| D. 234,099 | 1/1975 | Gobble | D1/120 |
| D. 247,071 | 1/1978 | Neidenberg et al. | D1/129 |
| D. 252,536 | 8/1979 | Goglanian et al. | D1/129 |
| D. 283,748 | 5/1986 | Duty | D1/106 |
| D. 358,699 | 5/1995 | Benham et al. | D1/125 |
| D. 358,962 | 6/1995 | Benham | D1/125 |
| D. 360,969 | 8/1995 | Uecker et al. | D1/125 |
| D. 373,231 | 9/1996 | Gluszak et al. | D1/125 |
| D. 373,232 | 9/1996 | Gluszak et al. | D1/125 |
| D. 373,233 | 9/1996 | Gluszak et al. | D1/125 |
| D. 374,969 | 10/1996 | Gluszak et al. | D1/125 |
| D. 375,183 | 11/1996 | Gluszak et al. | D1/125 |
| D. 375,395 | 11/1996 | Gluszak et al. | D1/102 |
| D. 376,037 | 12/1996 | Gluszak et al. | D1/102 |
| 2,227,728 | 1/1941 | Lombi | 53/546 |
| 2,600,222 | 6/1952 | Donofrio | 53/454 |
| 2,700,939 | 2/1955 | Liston | 425/89 |
| 3,050,017 | 8/1962 | Mahler | 426/275 |
| 3,188,780 | 6/1965 | Mead | 53/122 |
| 3,218,776 | 11/1965 | Cloud | 53/453 |
| 3,225,717 | 12/1965 | Page | 426/501 |
| 3,410,699 | 11/1968 | Peters | 426/512 |
| 3,418,140 | 12/1968 | Fisher | 53/453 X |
| 3,871,155 | 3/1975 | Blaser | 53/453 X |
| 4,076,207 | 2/1978 | Austin | 249/66.1 |
| 4,307,555 | 12/1981 | Mlodozeniec et al. | 53/546 |
| 4,381,697 | 5/1983 | Crothers | 99/353 |
| 4,567,714 | 2/1986 | Chasman | 53/560 X |
| 4,571,924 | 2/1986 | Bahrani | 53/453 |
| 4,578,273 | 3/1986 | Krubert | 426/87 |
| 4,586,888 | 5/1986 | Anderson | 425/362 |
| 4,630,426 | 12/1986 | Gentry | 53/453 X |
| 4,882,175 | 11/1989 | Ream et al. | 426/518 X |
| 4,894,978 | 1/1990 | Schonmann et al. | 53/560 |
| 4,999,206 | 3/1991 | Lortz | 426/512 |
| 5,146,730 | 9/1992 | Sadek et al. | 53/454 |
| 5,205,106 | 4/1993 | Zimmermann et al. | 53/122 X |
| 5,284,667 | 2/1994 | Zimmermann et al. | 426/420 |
| 5,297,947 | 3/1994 | Cardinali | 425/194 |
| 5,340,599 | 8/1994 | Maruyama et al. | 426/512 |
| 5,358,727 | 10/1994 | Yates et al. | 426/512 |
| 5,431,943 | 7/1995 | Sellmann | 426/512 |
| 5,455,053 | 10/1995 | Zimmermann et al. | 426/106 |
| 5,462,757 | 10/1995 | Booy et al. | 426/512 |
| 5,516,542 | 5/1996 | Zimmermann et al. | 426/420 |
| 5,536,517 | 7/1996 | Hannaford | 426/516 |
| 5,683,734 | 11/1997 | Israel | 426/496 |
| 5,732,163 | 3/1998 | Zimmermann et al. | 426/106 |
| 5,752,364 | 5/1998 | Benham | 426/512 X |
| 5,755,077 | 5/1998 | Benham | 426/125 X |
| 5,846,588 | 12/1998 | Zimmermann et al. | 426/420 |
| 5,876,777 | 3/1999 | Zimmermann et al. | 426/420 |

FOREIGN PATENT DOCUMENTS

96/08971  3/1996  WIPO.

OTHER PUBLICATIONS

Thos. Mills & Bros. Inc. 1924 p. 28 No. 152 Wafer.

*Primary Examiner*—Milton Cano
*Attorney, Agent, or Firm*—John A. O'Toole; L. MeRoy Lillehaugen; Alan D. Kamrath

[57] ABSTRACT

A food item includes one or more continuous strings (14e, 14f) and one or more continuous, thin strips (14c, 14d) of food adhered to the support material (16).

6 Claims, 6 Drawing Sheets

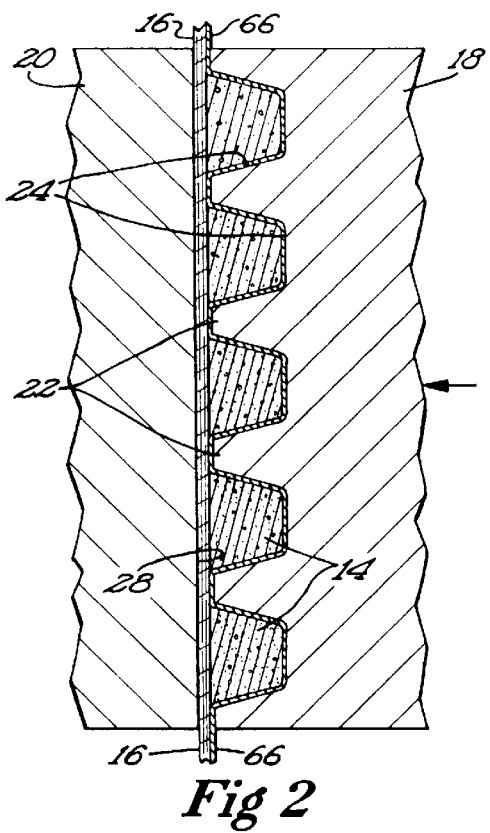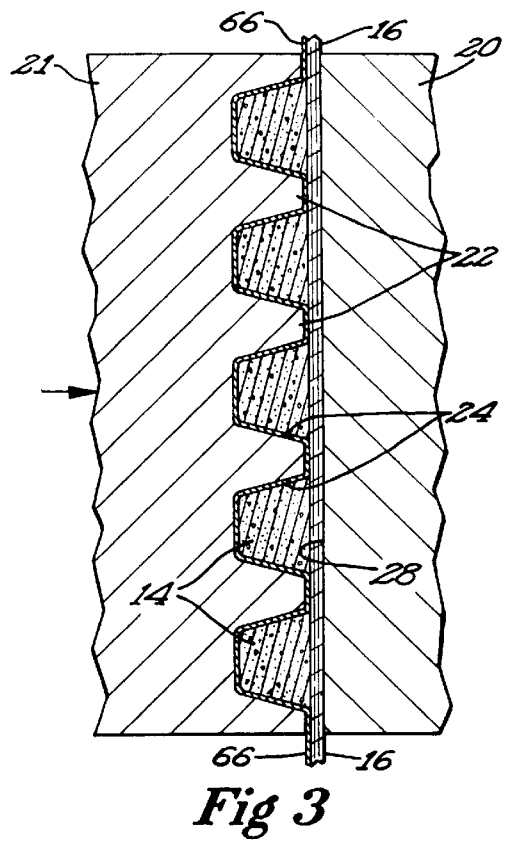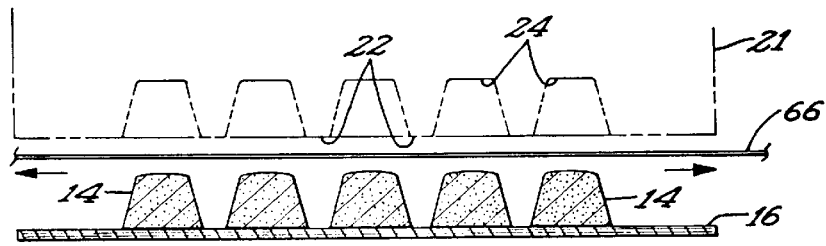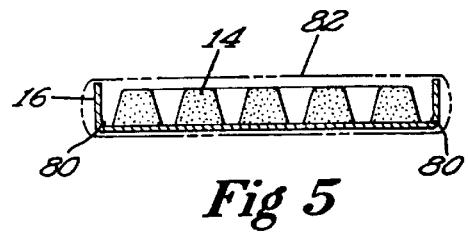

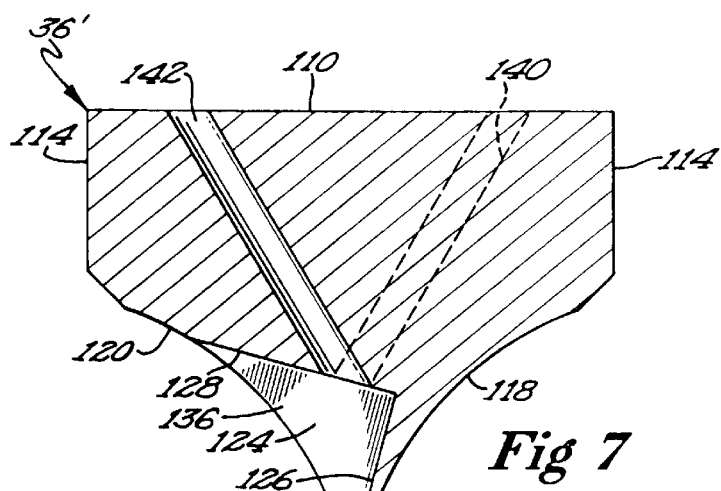
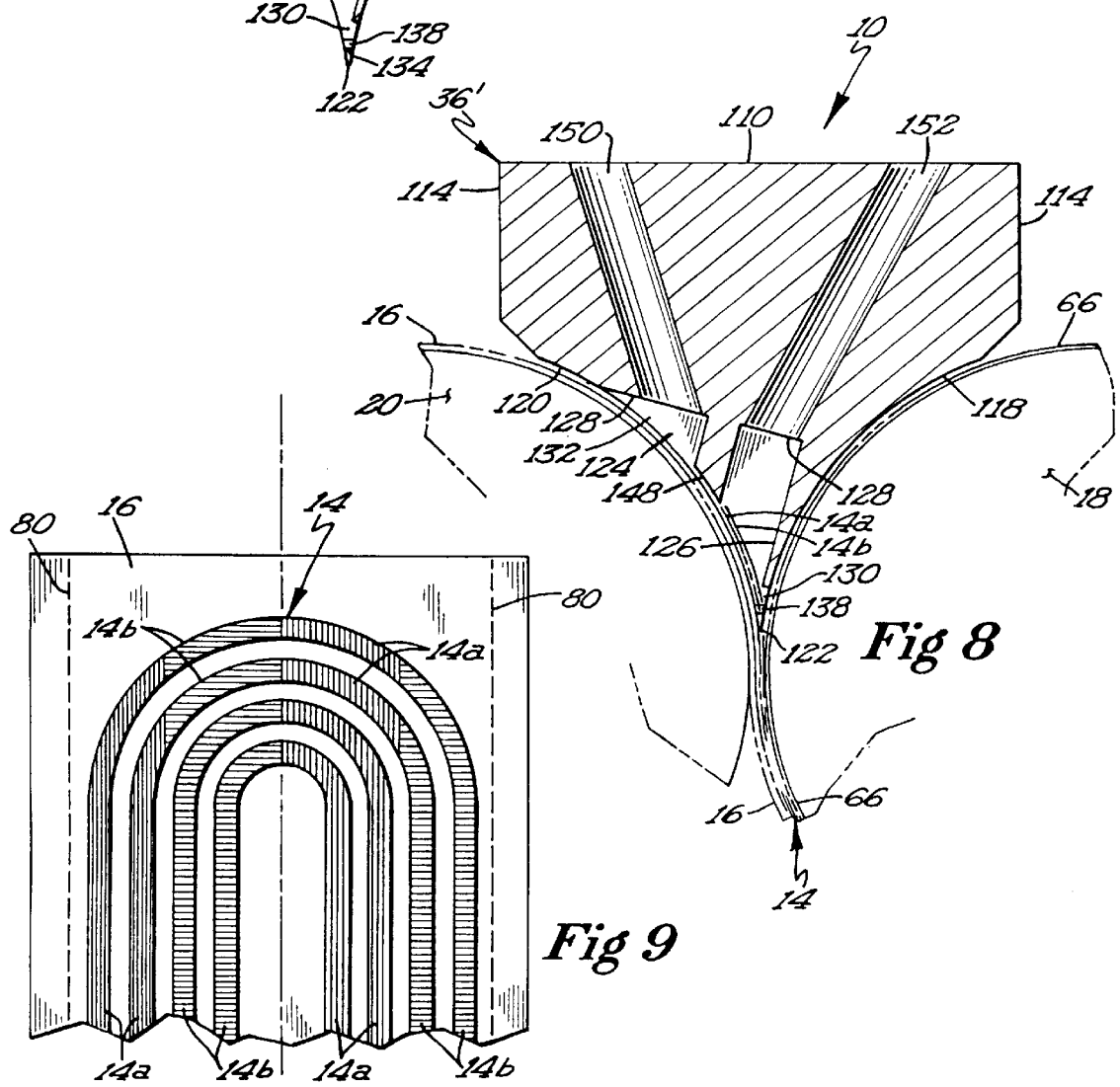

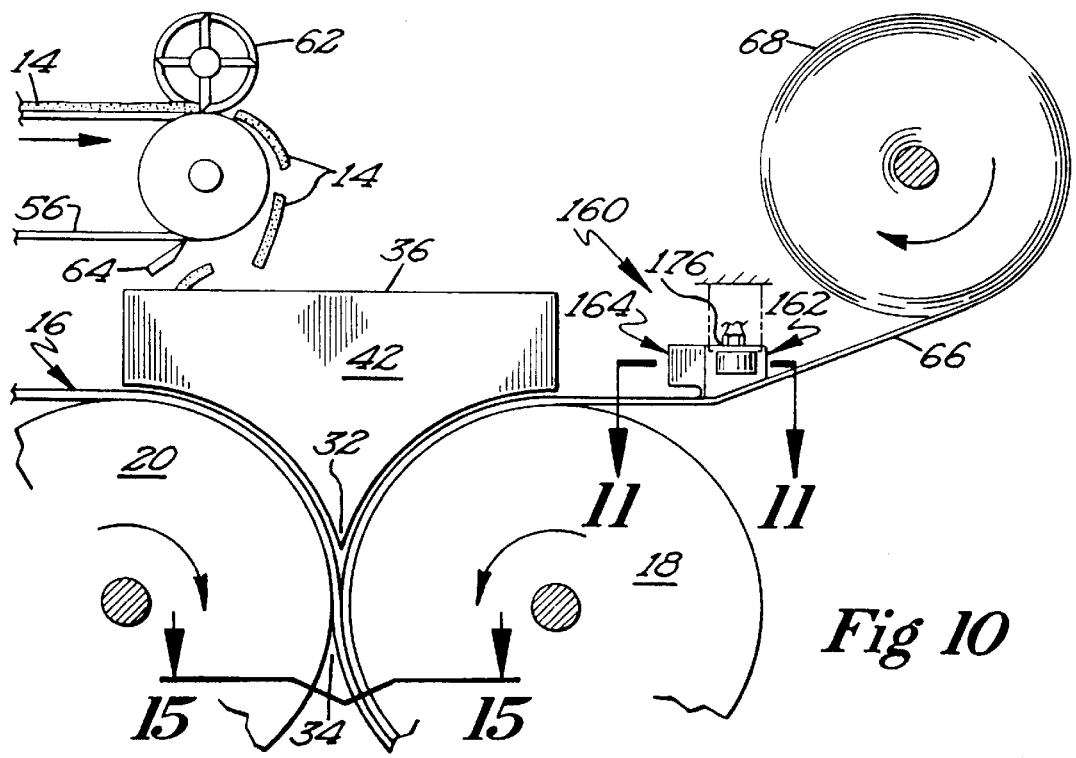
Fig 10
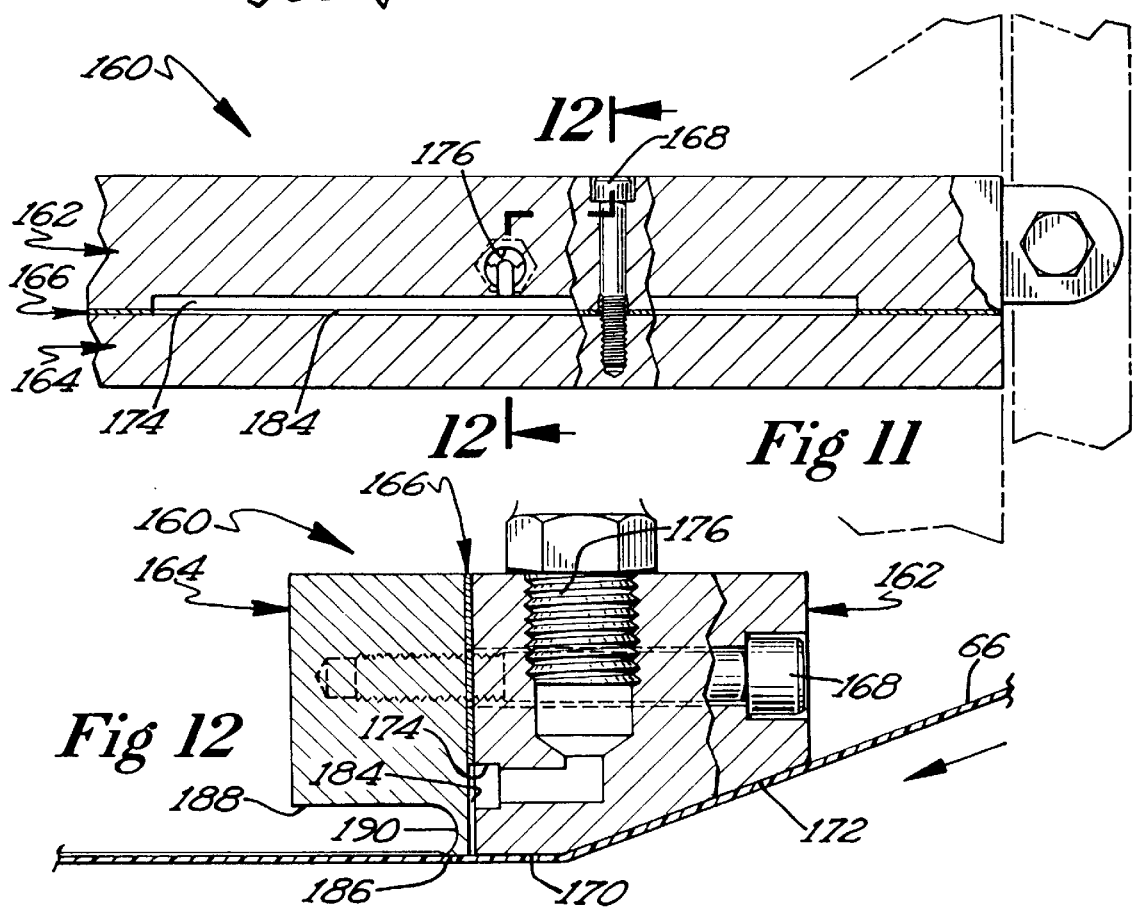
Fig 11
Fig 12

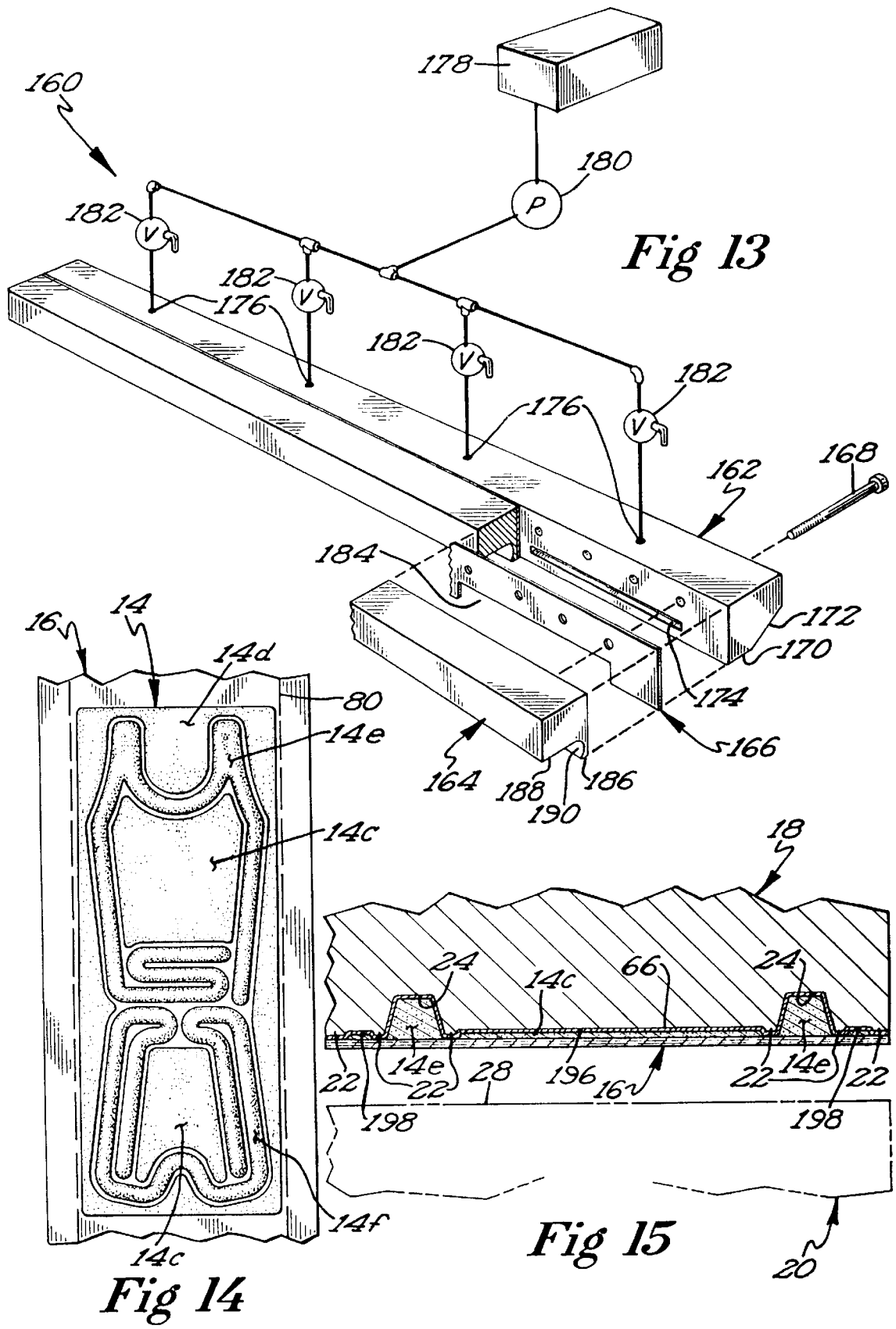

5,942,268

EMBOSSED SHAPE FOOD ITEM

This is a divisional of Ser. No. 09/144,620, filed Aug. 31, 1998, now U.S. Pat. No. 5,876,777 which is a divisional of Ser. No. 08/835,985, filed Apr. 14, 1997, now U.S. Pat. No. 5,846,588.

BACKGROUND

The present invention generally relates to apparatus and methods for fabricating food items, and particularly to apparatus and methods for fabricating food items including food of a desired embossed shape supported on support material.

The sale of snack-type food products is a highly competitive business. In addition to the particular food components, increasingly the novelty and play value of the product are important in the marketability of any particular food item. For example, fruit-based snack products such as FRUIT ROLL-UPS™ and FRUIT-BY-THE-FOOT™ fruit products have found wide market acceptance.

Accordingly, it is an object of the present invention to provide novel apparatus and methods for the fabrication of food items, which in the preferred form are in the form of continuous strings of food supported upon a relatively rigid strip of support material in a separately peelable arrangement. In the most preferred form, the food items include integral zones containing different foods which are not intermixed. In other preferred forms, the food items include continuous thin strips of food removably adhered to the support material separate and spaced from the strings of food.

Another object of the invention is to provide apparatus and methods where the food is compressed as strings and strips on the support material without a thin film of food being present on the support material and between the desired shape of food.

SUMMARY

Surprisingly, the above objectives can be satisfied in the field of food fabrication by providing, in the preferred form, apparatus and methods of food fabrication where a strip of support material and food are simultaneously fed between an anvil surface and a continuous forming surface of a first abutment nip to compress the food into grooves and depressions in the desired food shape and onto the support material. In the preferred form, the support material and food compressed thereon is passed between a second abutment nip having corresponding grooves and depressions in its continuous forming surface and in phase with the food compressed on the continuous strip of support material.

In a preferred form, the food is fed by a containment saddle in the form of a block located in the mating side of the first abutment nip, with the block including first and second surfaces having shapes corresponding to the anvil surface and the continuous forming surface, respectively. A trough is formed in the first surface for receiving the food under pressure for flowing into and between the first abutment nip. In a most preferred form, the trough is divided into volumes for receiving different foods to produce food items including integral food zones where the different foods are not intermixed.

In preferred aspects of the present invention, the first and second abutment nips are formed by first and second forming rollers rotatably abutting different portions of the periphery of an anvil roller.

In other aspects of the present invention, the phase of the continuous strip of support material and the food compressed thereon can be adjusted by changing the spacing of an idler roller which strips the continuous strip of support material and the food compressed thereon from the first forming roller.

In still other aspects of the present invention, a ribbon of film material is utilized to remove the compressed food from the grooves of the forming roller, with the ribbon of film material located intermediate the food and the forming rollers. In the most preferred form, a thin layer of edible oil such as high stability sunflower oil is applied to the ribbon of film material for more consistent and/or easier separation of the ribbon of film material from the compressed food and the support material.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 2 shows a partial, cross-sectional view of the apparatus of FIG. 1 according to section line 2—2 of FIG. 1.

FIG. 3 shows a partial, cross-sectional view of the apparatus of FIG. 1 according to section line 3—3 of FIG. 1.

FIG. 4 shows a diagrammatic, partial, end elevational view of the strings of food compressed on a sheet of support material by the apparatus of FIG. 1, with the ribbon of film material and a forming roller shown in phantom being exploded therefrom.

FIG. 5 shows a diagrammatic, cross-sectional view of the food item formed by the apparatus of FIG. 1.

FIG. 7 shows a cross-sectional view of the saddle of FIG. 6 according to section line 7—7 of FIG. 6.

FIG. 8 shows a cross-sectional view of the saddle of FIG. 6 according to section line 8—8 of FIG. 6, with portions of the apparatus of FIG. 1 shown in phantom.

FIG. 9 shows a partial, top view of a food item produced by the apparatus of FIG. 1 utilizing the saddle of FIG. 6.

FIG. 10 shows a partial, diagrammatic, side elevational view of an alternate embodiment of an apparatus for fabricating a food item according to the preferred teachings of the present invention.

FIG. 11 shows a partial, cross-sectional view of the apparatus of FIG. 10 according to section line 11—11 of FIG. 10.

FIG. 12 shows a cross-sectional view of the apparatus of FIG. 10 according to section line 12—12 of FIG. 10.

FIG. 13 shows a diagrammatic, partially exploded perspective view of the edible oil applicator of the apparatus of FIG. 1.

FIG. 14 shows a top view of a food item produced by the apparatus of FIG. 10.

FIG. 15 shows a cross-sectional view of the apparatus of FIG. 10 according to section line 15—15 of FIG. 10, with the anvil roller shown in phantom.

Figure 1:
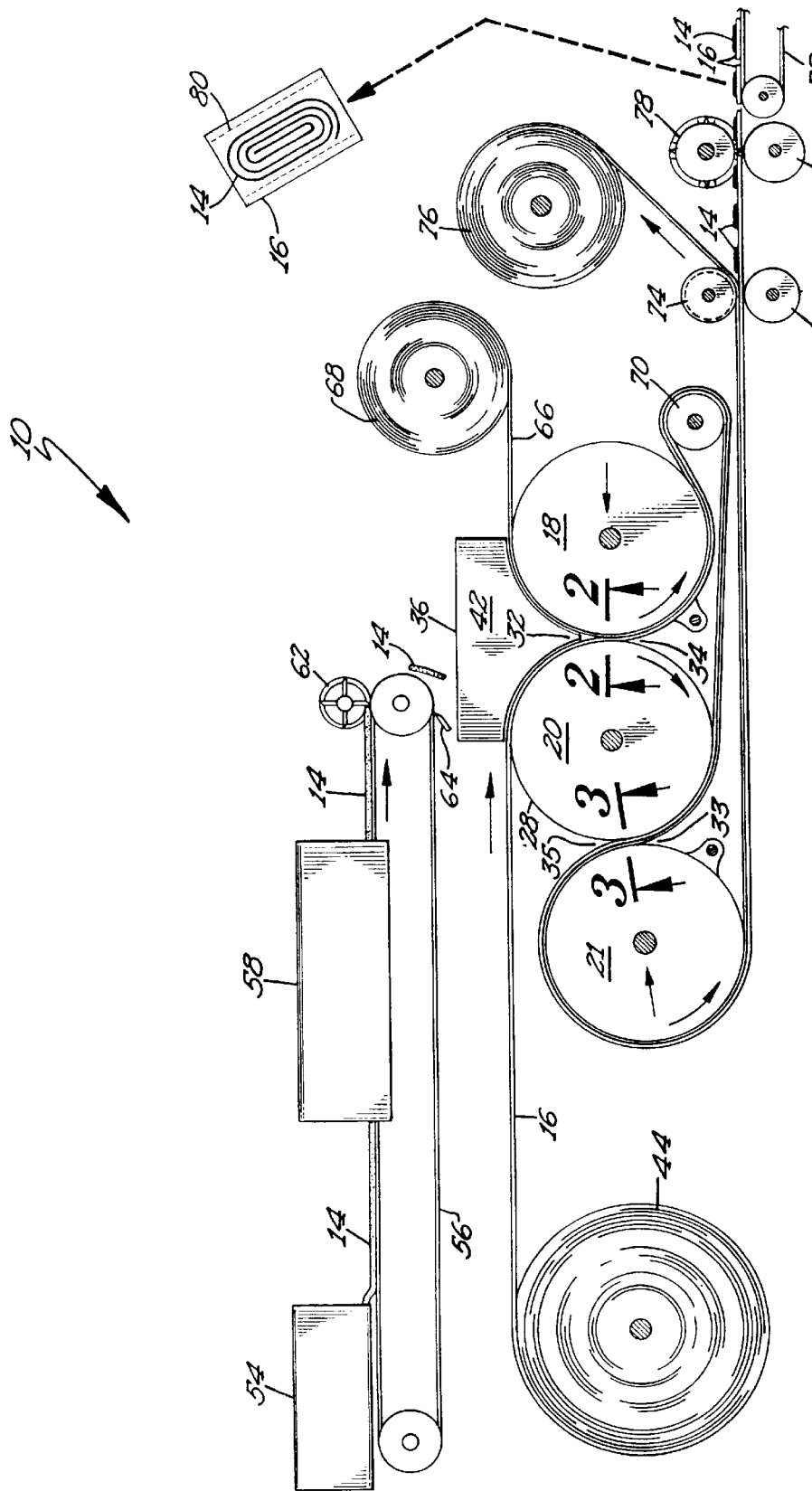
FIG. 1 shows a diagrammatic, side elevational view of an apparatus for fabricating a food item according to the preferred teachings of the present invention, with a food item being exploded and turned therefrom.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "axial", "longitudinal", "width", "height", and similar terms are used herein, it should be understood that these terms have reference only to the structure shown in the drawings as it would appear to a person viewing the drawings and are utilized only to facilitate describing the invention.

DESCRIPTION

An apparatus utilizing methods for fabricating a food item on a continuous strip of support material according to the preferred teachings of the present invention is shown in the drawings and generally designated 10. The food item generally includes a food 14 of any desired embossed shape supported on support material 16. In the preferred form, food 14 is in the form of a continuous string or rope of material in a nonintersecting arrangement such as an outwardly expanding spiral race track design as shown. In the preferred form, food 14 is a fruit-based material and in the most preferred form is in the form of a composition including a fruit base such as grape juice or pear concentrate and a gum system. In preferred forms, fruit puree is absent from the composition while in other forms puree is present. Support material 16 may be formed of any suitable material such as cardboard which has the necessary strength to support food 14 without tearing and without bulkiness to allow compression of food 14 onto support material 16 and which allows food 14 to be easily separated therefrom for consumption.

Apparatus 10 generally includes three rollers 18, 20 and 21. In the preferred form, rollers 18, 20 and 21 will have a tendency to be heated by food 14 and are cooled by any suitable means, not shown, such as by circulating water in the most preferred form and less preferably by pulsating cool water. In the preferred form, roller 18 is cooled to a temperature greater than 90° F. (32° C.) and preferably in the order of 120° F. (49° C.) by circulating warm water having a temperature in the order of 110° F. (43° C.). In the preferred form, rollers 20 and 21 are cooled to a temperature in the order of 40° F. (4° C.) by circulating cold water having a temperature in the order of 36° F. (2° C.).

The periphery defining a continuous forming surface of each forming roller 18 and 21 is grooved and specifically includes a plurality of circumferentially and axially spaced patterns. Each pattern includes one or more depressions or grooves 24, with lands 22 located between grooves 24 in each pattern and also separating the patterns from each other. The width of depressions or grooves 24 is generally equal to the desired width of the strings of food 14 and the height of lands 22 or in other words the depth of depressions or grooves 24 is generally equal to the desired thickness of the strings of food 14. The width of grooves 24 decreases from the peripheries of rollers 18 and 21 towards the center of rollers 18 and 21, with the side walls forming grooves 24 being non-parallel and having an angle greater than 15° relative to each other and in the most preferred form in the order of 20° to 30°. In the most preferred form, the depth of grooves 24 in roller 21 is slightly greater and in the most preferred form is 40% greater than the depth of grooves 24 in roller 18. The axial width of lands 22 between the patterns is generally equal to the desired lateral spacing between the strings of food 14 and the circumferential width of lands 22 between the patterns is generally equal to the desired longitudinal spacing between the strings of food 14. In the most preferred form, grooves 24 of roller 18 have a width in the order of 0.178 inch (0.452 cm) and a depth in the order of 0.125 inch (0.318 cm), with the width of lands 22 between grooves 24 in each pattern being in the order of 0.058 inch (0.147 cm). Grooves 24 of roller 21 have a width in the order of 0.196 inch (0.498 cm) and a depth in the order of 0.176 inch (0.447 cm), with the width of lands 22 between grooves 24 in each pattern being in the order of 0.040 inch (0.102 cm). The patterns can be of the same or different configurations, but each pattern on roll 18 has a corresponding pattern at complementary axial and cirumferential positions on roller 21.

Anvil roller 20 includes a cylindrical periphery 28 defining a continuous anvil surface which is relatively smooth in the most preferred form. Rollers 18 and 20 are rotatably mounted about parallel axes in an abutting relation, with periphery 28 of roller 20 engaging, rolling upon and movable relative to lands 22 of roller 18 along an abutment nip. Likewise, rollers 20 and 21 are rotatably mounted about parallel axes in an abutting relation, with periphery 28 of roller 20 engaging, rolling upon and movable relative to lands 22 of roller 21 along an abutment nip. The nip pressure between rollers 18 and 20 and rollers 20 and 21 is 1,000–2,000 psi (70–140 kg/cm$^2$) in the most preferred form and is obtained utilizing hydraulic pressure to bias rollers 18 and 21 against roller 20. In the most preferred form, rollers 18, 20 and 21 are generally cylindrical and of equal diameters. The axes of rollers 18 and 20 are horizontally offset from each other, with the axis of roller 21 being vertically offset below the axis of roller 20 and horizontally offset from the axis of roller 20 on the side opposite roller 18. The anvil surfaces of the first and second abutment nips between rollers 18, 20 and 21 are located at different portions of periphery 28 of roller 20 and at portions which are less than 180° apart in the most preferred form. Rollers 18 and 20 are rotated in opposite rotational directions to define an upper, mating side 32 and a lower, exit side 34. Similarly, rollers 20 and 21 are rotated in opposite rotational directions to define a lower, feed side 33 and an upper, exit side 35. To allow cleaning, rollers 18 and 21 may be movably mounted relative to and loaded against roller 20 such as by pivotable mounting to allow separation of rollers 18 and 21 from roller 20.

Food 14 is filled into upper mating side 32, with a containment saddle 36 being provided complementary to and for holding food 14 above and evenly feeding material to and within mating side 32. In the preferred form, saddle 36 includes end pieces 42 extending radially between and engaging the peripheries of rollers 18 and 20. In the most preferred form, end pieces 42 extend generally perpendicular to the rotational axes of rollers 18 and 20.

Food 14 in the most preferred form is extruded from an extruder 54 in the form of a single extrudiate rope on a conveyor 56 in the most preferred form at a temperature in the order of 200° F. (93° C.). While on conveyor 56, food 14 passes through an air impingement cooling tunnel 58 to cool the food to a temperature where food 14 is plastic but not flowable and in the most preferred form in the order of 160–170° F. (71–77° C.). After cooling tunnel 58 and prior to but closely adjacent the end of conveyor 56, the extrudiate rope of food 14 is cut by a rotating, helical reel type cutter 64 into small segments of a few inches or centimeters in length. Due to the helical nature of the blades of cutter 64, the segments of food 14 are pushed from a linear relation with the extrudiate rope to prevent the ends of the segments of food 14 from reattaching to reform a rope. After cutter 64, the segments of food 14 are allowed to fall by gravity into saddle 36, with any segments of food 14 which adhere to conveyor 56 being scraped therefrom such as by a scraper 64. In the most preferred form, conveyor 56 is positioned above and parallel to the axes of rollers 18 and 20.

Support material 16 typically is supplied from a roll 44 and is threaded to extend over periphery 28 of roller 20 located within saddle 36 and mating side 32, and to extend between the nip of rollers 18 and 20 into exit side 34.

A continuous ribbon of thin film material 66 is typically supplied from a roll 68 and is threaded to extend over lands 22 and grooves 24 of the periphery of roller 18 located within saddle 36 and mating side 32, and to extend between the nip of rollers 18 and 20 into exit side 34. Film material 66 in the preferred form is a plastic material having a low memory and either having characteristics or suitably coated for ease of removal from food 14.

Food 14 is initially located in mating side 32 intermediate support material 16 and film material 66 supported by rollers 20 and 18, respectively. It can then be appreciated that as food 14 and material 16 and 66 are pulled and simultaneously fed between the abutment nip between rollers 18 and 20 by the rotation of rollers 18 and 20, food 14 and material 66 advancing between rollers 18 and 20 will be compressed into grooves 24 such that food 14 will be deposited in the shapes of the pattern formed by grooves 24 upon support material 16, with the width and height of the strings of food 14 generally corresponding to the width and depth of grooves 24. Depending upon several factors, food 14 and material 66 may not be forced to entirely fill grooves 24 as diagramatically shown in the drawings, with such a result clearly being desired at least for consistency in the amount of food 14 compressed on support 16. Rather, food 14 and material 66 may not be forced into the corners of grooves 24 such that food 14 at locations spaced from support 16 will have a more rounded configuration.

It can then be appreciated that if food 14 were fed into saddle 36 as an extrudiate rope, a tendency may exist for the rope to coil upon itself as it falls into saddle 36 creating air spaces or gaps which may prevent food 14 from filling cavities 24. According to the preferred teachings of the present invention, feeding food 14 in the form of segments prevents such coiling and the air spaces created thereby such that consistent filling of cavities 24 is obtained as the food segments tend to be self-distributing. Thus, less operator attention and monitoring is required for apparatus 10 according to the preferred teachings of the present invention.

It should also be appreciated that if food 14 is fed to mating side 32 in a too-hot, flowable condition, food 14 may not be able to compress material 66 completely into grooves 24 resulting in food 14 having a width and depth substantially less than that of grooves 24. Similarly, if food 14 is fed to mating side 32 in a too-cold, waxy condition, food 14 may not be pulled between the abutment nip between rollers 18 and 20 to fill grooves 24 and thus also resulting in food 14 having a width and depth substantially less than that of grooves 24. Likewise, if rollers 18 and 21 are too hot, material 66 may have a tendency to rip as it is compressed into grooves 24. Further, the nip pressure between rollers 18, 20, and 21 is important to push food 14 into grooves 24 and overcome the stretch resistance of material 66 of being compressed into grooves 24 and to minimize or prevent flashing by food passing between the peripheries of rollers 18, 20, and 21 intermediate grooves 24 and being evidenced by a thin film on support material 16 between the strings of food.

Apparatus 10 according to the preferred teachings of the present invention further includes an idler roller 70 having a smooth periphery and an axial length generally equal to that of rollers 18, 20 and 21 and the lateral width of the web support material 16. The diameter of roller 70 is substantially less than and in the most preferred form one-fifth the diameter of rollers 18, 20 and 21. The axis of roller 70 is parallel to the axes of rollers 18, 20 and 21 and vertically offset below the axis of roller 18 generally equal to the radius of roller 18. The axis of roller 70 is horizontally offset from the axis of roller 18 on the side opposite rollers 20 and 21 slightly larger than the radius of roller 18, with at least the horizontal offset of roller 70 being adjustable.

In exit side 34 after the abutment nip between rollers 18 and 20, support material 16 with food 14 and material 66 sandwiched against roller 18 will extend around slightly greater than 90° of the periphery of roller 18 to separate support material 16 from roller 20 and then extend generally tangentially from roller 18. As support material 16 separates from roller 18, material 66 will pull food 14 from grooves 24 of roller 18. It can then be appreciated that material 66 must have sufficient strength to pull food 14 from grooves 24 without tearing or breaking but have sufficient stretchability and flexibility to allow food 14 to be compressed into grooves 24 in the abutment nip of a volume generally equal to that of grooves 24. Additionally, film material 66 has a low resiliency or memory which does not tend to smash food 14 undesirably deforming the shape of food 14 after leaving forming rollers 18 and 21. Specifically, in the most preferred form, the ribbon of film material 66 has a low tensional strength and particularly in the most preferred form will stretch 110% due to the application of a force of less than one pound (0.4536 kg) utilizing the tensional properties of thin plastic sheeting test procedure of ASTM D882. If material 66 had greater tensional strength, less food 14 would be compressed in grooves 24 and thus compressed on support material 16. In the most preferred form, film material 66 is formed of linear low density polyethylene having a thickness in the order of 0.0005 inches (0.0127 mm). Thicker films tend to have greater tensional strengths, but films thicker than the preferred form might work if possessing the relatively low tensional strength required according to the preferred teachings of the present invention. The diametric size and positioning of roller 70 as disclosed is also important in the ability of material 66 to remove food from grooves 24 of roller 18. It is also believed that the sudden pressure differential between above the nip abutment where food 14 is under pressure as it is compressed into grooves 24 and below the nip abutment where food 14 is not under pressure as it passes the nip abutment tends to pop or remove the food from grooves 24 of roller 18.

Food 14 and material 16 and 66 extends around over 180° of roller 70 such that it is inverted and extends towards rollers 20 and 21, with material 66 holding food 14 against the lower surface of material 16. Material 16 engages periphery 28 of roller 20 generally at a point vertically below the axis of roller 20 and extends on periphery 28 for generally 90° into feed side 33 and passes between the abutment nip between rollers 20 and 21. When entering the abutment nip, material 66 and food 14 enters grooves 24 of roller 21, with grooves 24 further compressing food 14 into the shape of the particular pattern. It was found that compressing food 14 between a single pair of rollers 18 and 20 results in a thin film of food being present upon support material 16 between lands 22 and periphery 28 and between the desired shape of food 14 formed by grooves 24. Compressing food 14 between a second pair of rollers 20 and 21 results in food 14 being in the desired shape of food 14 formed by grooves 24 and generally without food being present upon support material 16 in the form of thin film or flashing between lands 22 and periphery 28.

It can be appreciated that food 14 and material 16 and 66 should enter mating side 33 of rollers 20 and 21 generally in phase with grooves 24 of roller 21. It can then be appreciated that roller 70 can be moved to adjust the phase of food 14 and material 16 and 66 to match that of grooves 24 of roller 21, with adjustment being dependent upon several factors including the stretch-ability of material 16, the tension placed upon material 16 and like factors.

After the abutment nip between rollers 20 and 21, support material 16 with food 14 and material 66 sandwiched against roller 21 extends through exit side 35 and slightly greater than 270° of the periphery of roller 21. Apparatus 10 in the most preferred form further includes a pair of counter rotating rollers 74 and 75 having vertically spaced, parallel axes parallel to and spaced from the axes of rollers 18, 20, 21 and 70. In the most preferred form, roller 75 is a steel roller including a smooth periphery and roller 74 is a rubber coated steel roller including a plurality of lands which roll on material 66 and 16 laterally intermediate the strings of food 14 on material 16, with the depths of the grooves between the lands being at least equal to or greater than the height of food 14 on support material 16. Support material 16 with food 14 and material 66 thereon extends from the periphery of roller 21 horizontally below rollers 18, 20, 21 and 70 due to the vertical offset of roller 21 below rollers 18 and 20 and between the abutment nip of rollers 74 and 75 for pulling upon support material 16. Material 66 extends generally tangentially from roller 74 to a rotated take-up roll 76 at an acute angle in the order of 45° from support material 16 and food 14 extending generally horizontally from rollers 74 and 76. After material 66 has been removed, support material 16 is cut into segments such as by one or more pairs of cutting rollers 78 and 79 to longitudinal lengths and widths between the embossed shapes of food 14. In the most preferred form, support material 16 in addition to being cut to width is perforated at 80 to form flaps having a height generally equal to food 14 which can be folded upward. After cutting to longitudinal lengths by rollers 78 and 79, the individual food items are transferred to a vacuum conveyor 72 for further processing. For example, after cutting and folding, the individual food item can be suitably packaged in a wrapper 82 shown in phantom in FIG. 5 and placed in cartons including the desired number of food items.

The food items fabricated with apparatus 10 according to the methods of the preferred teachings of the present invention generally include support 16 formed of a generally rigid material and specifically 12 or 14 point cardboard of a size of 6.8 inch (17.3 cm) by 2.3 inch (5.8 cm) in the most preferred form. The continuous string of food 14 has first and second, opposite, free ends having an elongated length between the ends substantially greater than the length and width of support and specifically in the order of 54 inches (137 cm). Thus, food 14 has a range density of 3–4 linear inch per square inch (1.2–1.6 linear centimeter per square centimeter) and in the most preferred form in the order of 3.3 linear inch per square inch (1.3 linear centimeter per square centimeter) of support 16. The continuous string of food 14 is removably adhered to the planar upper surface of support 16 in a serpentine and non-intersecting manner. Thus, a consumer can gradually peel the continuous string of food 14 from support 16 while the unpeeled portions remain adhered to support 16 to enhance the play value of the food item. Furthermore, the arrangement of the continuous string of food 14 on support 16 can be varied both in general appearance such as between an outwardly expanding spiral race track design as diagrammatically shown in FIG. 1, an eyeglass design, or other design and/or in the manner that the particular design changes as the continuous string of food 14 is peeled from support 16 and thus increasing the novelty of the food item.

The upper surface of support 16 should include a suitable coating such that food 14 adheres thereto during fabrication, packaging, storage, and other handling but can be generally readily removed therefrom when pulled and without fracturing or otherwise breaking the continuous nature of the string of food 14. In the most preferred form, support 16 includes an extrusion coated, nylon based release coating having a tack release factor characterized by a very low surface energy value. If the surface energy value of support 16 is too high in the order of 30 dynes/cm, the continuous string of food 14 can not be readily removed from support 16. On the other hand, if the surface energy value of support 16 is too low in the order of 15 dynes/cm such as used for the support material in the FRUIT-BY-THE-FOOT™ fruit products, the continuous string of food 14 tends to come off all in one piece rather than in a manner allowing the continuous string of food to be gradually peeled from support 16 according to the preferred teachings of the present invention. Thus, in the most preferred form, the surface energy value of the release coating should be in the range of 15 to 30 dynes/cm, particularly in the order of 20–25 dynes/cm and in the most preferred form in the order of 23–25 dynes/cm. Additionally, the coverage factor must be high and specifically the release coating should cover at least 90% and preferably greater than or equal to 95% and for best results approximately 100% of the surface area of the upper surface of support 16. Food 14 tends to adhere to paper fibers forming support 16 which are not coated by the release coating making removal of those portions difficult.

In the most preferred form, a gram of food 14 is formed into 3 to 10 centimeters and in the most preferred form in the order of 6.5 centimeters of length of string of food 14. If the weight versus length ratio is too low, the string of food 14 will tend to tear as it is pulled from support 16 and if too high will tend to pull off as a single piece from support 16. It can then be appreciated that the weight versus length ratio is related to the width of food 14 at support 16 and the thickness or height of food 14 in a direction generally perpendicular to support 16, with the width and height of food 14 in the string being generally equal in the most preferred form and in the order of 3–4 millimeters and in the most preferred form about 3.2 millimeters.

The use of three rollers 18, 20 and 21 to form the first and second abutment nips according to the preferred teachings of the present invention is believed to be advantageous over forming the first and second abutments from first and second pairs of rollers. Specifically, the number of parts required in apparatus 10 is reduced thus reducing capital and operating costs as well as reduction in the overall size of apparatus 10. Further, lateral tracking, i.e. in a direction perpendicular to the movement of materials 16 and 66, is believed to be easier to obtain when a single anvil roller 20 is utilized.

In an alternate embodiment of apparatus 10 according to the teachings of the present invention, two or more differing types of food 14a and 14b are supplied into upper mating side 32 of rollers 18 and 20, with a containment saddle 36' being provided complementary to and for holding food 14a and 14b above and evenly feeding material to and within mating side 32. In the preferred form, food 14a and 14b is formed from the same base material but is colored differently. Specifically, in the preferred form, extruder 54 extrudes a fruit-based material 100 in the form of a pumpable composition. Material 100 is divided into the desired number of substreams 100a and 100b such as by a simple Y-type divider for two substreams 100a and 100b as in the most preferred form. After dividing into substreams 100a and 100b, any suitable additive 102a and 102b such as a colorant in the preferred form is added to each substream 100a and 100b to create food 14a and 14b. After the addition of additive 102a and 102b, food 14a and 14b is divided into the desired number of supply lines such as three each in the most preferred form. The supply lines may include suitable static mixers for mixing material 100 and additives 102a and 102b before saddle 36'. The supply lines may also include suitable provisions 104 such as gear pumps as diagramatically shown for supplying food 14a and 14b to saddle 36' under pressure and in a metered amount. It should be recognized that food 14a and 14b can be supplied to saddle 36' by differing arrangements and/or can be formed with differing materials according to the preferred teachings of the present invention.

Saddle 36' in the preferred form is formed as a block of a solid construction and having a shape and size corresponding to and for receipt into upper mating side 32 of rollers 18 and 20. In particular, saddle 36' includes a top surface 110 extending generally horizontally and parallel to the plane extending through the axes of rollers 18 and 20. Saddle 36'further includes first and second ends 112 extending radially between and engaging the peripheries of rollers 18 and 20. In the preferred form, ends 112 extend generally perpendicular to the rotational axes of rollers 18 and 20 and to top surface 110. Also, saddle 36' includes first and second sides 114 extending axially between ends 112, with sides 114 extending generally perpendicular to ends 112 and top surface 110. According to the teachings of the present invention, saddle 36' includes first and second, arcuate, lower surfaces 118 and 120. In particular, second surface 120 has a radius generally corresponding to the combined radius of roller 20 and support material 16 located on the periphery of roller 20 in the most preferred form. Surface 120 abuts with support material 16 with a force allowing movement of roller 20 and support material 16 relative to surface 120. First surface 118 has a radius generally corresponding to the combined radius of roller 18 and film material 66 located on the periphery of roller 18 in the most preferred form. In the most preferred form, surface 118 is adjacent to but slightly spaced from film material 66 allowing movement of roller 18 and film material 66 relative to surface 118 without binding of film material 66. Surfaces 118 and 120 intersect along a line 122 as close as possible to the nip between rollers 18 and 20.

Saddle 36' according to the preferred teachings of the present invention includes a trough 124 formed in surface 120, with trough 124 having axial cross sections of a right angular shape in the most preferred form. In particular, trough 124 includes a first flat surface 126 extending generally parallel to but spaced from a tangent of surface 118 extending from line 122 and a second flat surface 128 extending generally perpendicular to surface 126 and spaced from line 122. Trough 124 according to the preferred teachings of the present invention further includes a removed portion 130 intersecting and extending between surfaces 118 and 126. The top surface of removed portion 130 is parallel to and spaced from line 122 a distance so that it is spaced from the periphery of roller 20 generally equal to the height of food 14 desired to pass between the nip of rollers 18 and 20 and in the most preferred form is spaced from line 122 generally equal to 0.5 inches (1¼ cm).

In the most preferred form where roller 18 includes a plurality of circumferentially and axially spaced patterns, saddle 36' includes one or more, radially disposed dividing walls or barriers 132 located in trough 124 at axial spacings corresponding to the axial spacing between the patterns on roller 18. Barriers 132 are thus disposed parallel to the rotation direction which the continuous forming surface of roller 18 moves relative to the anvil surface of roller 20 when rollers 18 and 20 rotate. In the preferred form, barriers 132 include surfaces 118 and 120 but terminate along a line 134 parallel to but spaced above line 122 a distance of about 0.19 inches (0.5 cm) in the most preferred form. This greater spacing of line 134 of barriers 132 allows movement of rollers 18 and 20 and material 16 and 66 relative to saddle 36' without binding of film material 66 but is sufficiently close to the nip of rollers 18 and 20 to generally prevent axial passage of food 14 between line 134 of barriers 132 and the nip of rollers 18 and 20. It should be recognized that the axial width of barriers 132 perpendicular to the rotation direction of rollers 18 and 20 should be sufficient to prevent any food 14 which should axially pass between line 134 and the nip of rollers 18 and 20 from one side of barrier 132 from reaching the opposite side. Further, it should be understood that any food 14 passing between line 134 and the nip of rollers 18 and 20 will be forced axially back toward the patterns of roller 18 due to the nip pressure between rollers 18 and 20 in the preferred form, with food 14 preferably being forced in the nip in the opposite direction that food 14 moved in mating side 32 to generally prevent intermixing of food 14 on opposite sides of barriers 132. In the embodiment shown, two barriers 132 are formed to divide trough 124 into three equal volumes or portions and it should be appreciated that roller 18 could then preferably include three, axially spaced rows of patterns. However, fewer or greater number of barriers 132 could be provided according to the preferred teachings of the present invention.

In the most preferred form of the present invention, trough 124 further includes axially spaced, radially disposed dividing walls 136. Dividing walls 136 are thus disposed parallel to the rotation direction which the continuous forming surface of roller 18 moves relative to the anvil surface of roller 20 when rollers 18 and 20 rotate. In the preferred form, walls 136 include surfaces 118 and 120 but terminate along line 134. The lower ends of walls 136 in the most preferred form include radially extending, planar, tapering surfaces 138 of an increasing axial size from line 134. In the most preferred form, walls 136 have a minimal axial width along line 134 and perpendicular to the rotation direction of rollers 18 and 20 which does not cut film material 66 and which is not subject to wear. Line 134 of dividing walls 136 should be sufficiently close to the nip of rollers 18 and 20 to generally prevent axial passage of food 14 between line 134 of dividing walls 136 and the nip of rollers 18 and 20 and thus generally separate and prevent intermixing of food 14 on opposite sides of dividing walls 136. However, the axial width of dividing walls 136 especially along line 134 should be sufficiently small that food 14 on opposite sides of dividing walls 136 flows together to abut after leaving saddle 36' and into and between the nip of rollers 18 and 20 as they rotate. If the axial width of dividing walls 136 is too great, food 14 will not integrally fabricate or bond together when flowing between the nip of rollers 18 and 20 such that the string of food 14 produced by apparatus 10 is not continuous as is most desired according to the preferred teachings of the present invention.

Figure 6:
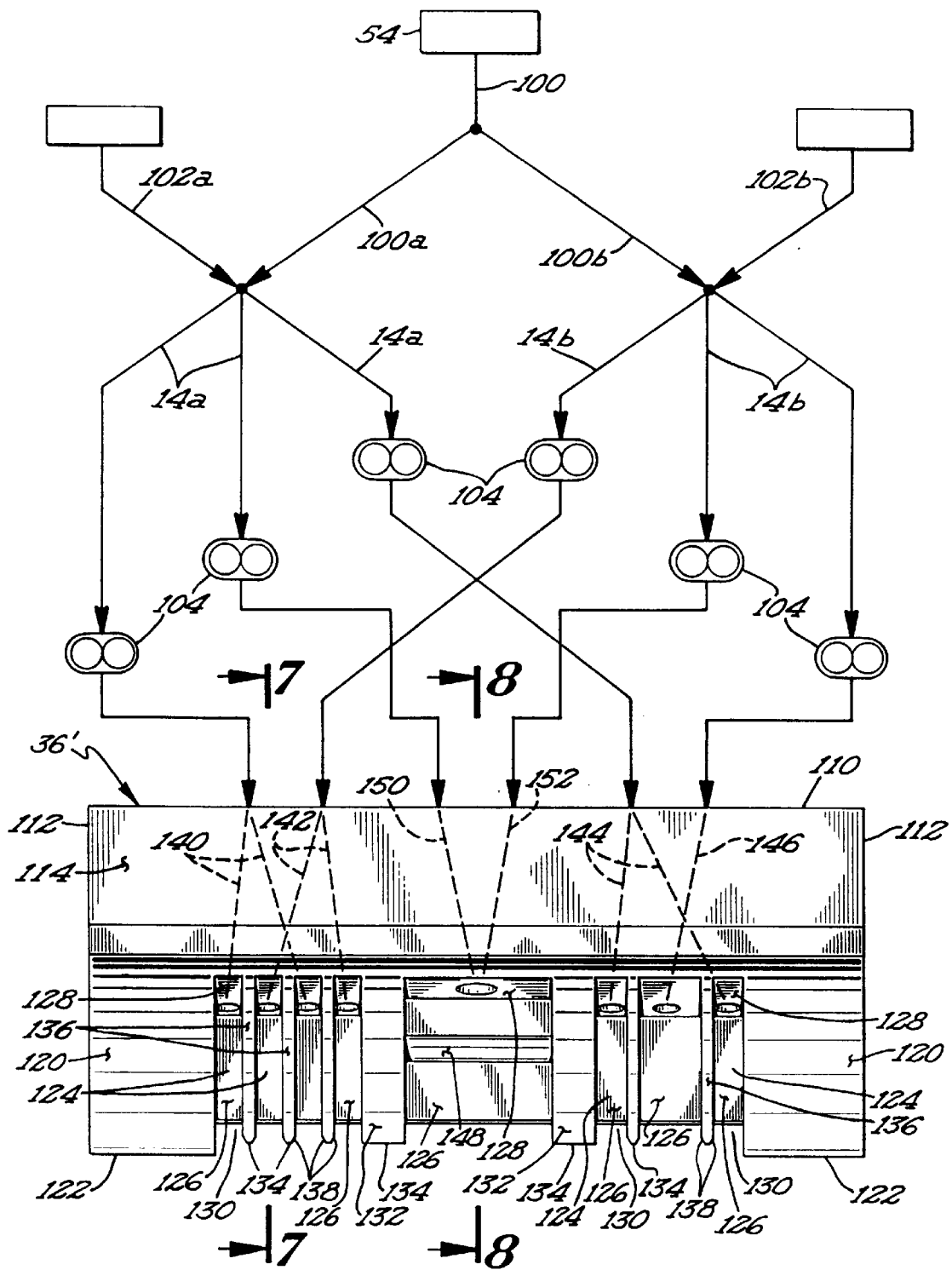
FIG. 6 shows a front, partially diagramatic elevational view of an alternate embodiment of a containment saddle for use in the apparatus of FIG. 1.

In the most preferred form, the left portion of saddle 36' as viewed in FIG. 6 includes three dividing walls 136 at generally equal axial spacings to create four volumes. Conduits 140 extend from top surface 110 and intersect with surface 128 within the first and third volumes and are in fluid communication with food 14*a*. Conduits 142 extend from top surface 110 and intersect with surface 128 within the second and fourth volumes and are in fluid communication with food 14*b*. A food item produced by apparatus 10 according to the preferred teachings of the present invention by patterns axially aligned with the left portion of saddle 36' is shown in FIG. 9. In particular, such a food item includes a continuous string of food 14 including zones of food 14*a*, of food 14*b*, of food 14*a*, and of food 14*b* of generally equal lateral widths and parallel to the length of support 16 and spaced from each other perpendicular to the rotation direction of rollers 18 and 20, with food 14*a* and 14*b* generally not intermixed in each other's zones or in other words food 14*b* is generally absent from the zones of food 14*a* and food 14*a* is generally absent from the zones of food 14*b*.

In the most preferred form, the right portion of saddle 36' as viewed in FIG. 6 includes two dividing walls 136 to create three volumes, with the center volume having an axial width generally equal to the combined axial widths of the first and third volumes which in the preferred form are equal. Conduits 144 extend from top surface 110 and intersect with surface 128 within the first and third volumes and are in fluid communication with food 14*a*. Conduit 146 extends from top surface 110 and intersects with surface 128 within the center volume and is in fluid communication with food 14*b*. A food item produced by apparatus 10 according to the preferred teachings of the present invention by patterns axially aligned with the right portion of saddle 36' would include a continuous string of food 14 including zones of food 14*a*, of food 14*b*, and of food 14*a*, with the zone of food 14*b* being equal to the combined lateral widths of the first and third zones which would be equal, with food 14*a* and 14*b* generally not intermixed in each other's zones.

In the preferred form of the present invention, trough 124 further includes an axially disposed dividing wall 148 which in the most preferred form extends between and is integrally formed with barriers 132. In particular, wall 148 extends generally perpendicular from surface 128 spaced from and parallel to surface 126. Thus, wall 148 is disposed perpendicular to the direction which the continuous forming surface of roller 18 moves relative to the anvil surface of roller 20 when rollers 18 and 20 rotate. The lower end of wall 148 is arcuate shape concentric to and at a greater radial spacing than surface 120. Conduit 150 extends from top surface 110 and intersects with surface 128 on the side of wall 148 opposite surface 126 and is in fluid communication with food 14*a*. Conduit 152 extends from top surface 110 and intersects with surface 128 intermediate wall 148 and surface 126 and is in fluid communication with food 14*b*. In operation, food 14*a* flows from trough 124 and is deposited as a layer on support material 16 axially intermediate barriers 132 at a thickness generally equal to the radial spacing between surface 120 and the lower end of wall 148 as rollers 18 and 20 rotate and food 14*a* is metered into trough 124. Dividing wall 148 prevents food 14*a* and 14*b* from mixing in trough 124. Food 14*b* flows from trough 124 and is deposited as a layer on the layer of food 14*a* opposite to support material 16 axially intermediate barriers 132. The layers of food 14*a* and 14*b* have a combined thickness generally equal to the radial spacing between surface 120 and the top surface of removed portion 130. Food 14*b* does not generally intermix with food 14*a* during its deposit on the layer of food 14*a*. Food 14*a* and 14*b* in layers flows into and between the abutment nip of rollers 18 and 20 as the continuous forming surface on the periphery of roller 18 moves relative to the anvil surface on the periphery of roller 20. In the preferred form, the radial spacing between surface 120 and wall 148 and the thickness of the layer of food 14*a* is generally equal to one-half the radial spacing between surface 120 and the top surface of removed portion 130 and the combined thickness of the layers of food 14*a* and 14*b*. However, it can be appreciated that other radial spacings can be utilized producing other layer thicknesses according to the teachings of the present invention. A food item produced by apparatus 10 according to the preferred teachings of the present invention by patterns axially aligned with the middle portion of saddle 36' would include a continuous string of food 14 including a zone of food 14*a* in the form of a layer adjacent support material 16 and an integral zone of food 14*b* in the form of a layer on the opposite side of the layer of food 14*a* than support material 16, with food 14*a* and 14*b* generally not intermixed in each other's zones.

Although in the most preferred form food 14*a* and 14*b* is integrally connected but not intermixed, there may be occasions that intermixing may be desired. For example, food 14*a* and 14*b* of differing colors could be allowed to partially intermix at their interconnection to produce a third color, with the resulting food item then including a zone of food 14*a* of one color, a zone of intermixed food 14*a* and 14*b* of another color, and a zone of food 14*b* of still another color. Such intermixing could be accomplished by increasing the spacing of line 134 of walls 136 from the nip of rollers 18 and 20, with the amount of intermixing and thus the axial width of intermixed food 14*a* and 14*b* in the resulting food item being dependent on the amount of such spacing.

In the embodiment shown, saddle 36' according to the teachings of the present invention produces three different arrangements of food 14*a* and 14*b*. It should then be appreciated that saddle 36' can be constructed according to the teachings of the present invention to produce the same arrangements of foods 14*a* and 14*b* and/or other arrangements of food 14*a* and 14*b* such as but not limited to providing only a single dividing wall 136 in one or more portions of trough 124 to produce a food item including a continuous string of food including only two zones, one of food 14*a* and the other of food 14*b*, of equal or unequal axial widths.

It should be noted that food 14 is under pressure in trough 124 of saddle 36' according to the preferred teachings of the present invention and thus does not merely rely upon gravity and the weight of food 14 itself to force food to flow into and between the nip of rollers 18 and 20. Therefore, more consistent filling of cavities 24 results. Due to government regulations and prior to using saddle 36' of the present invention, the weight of food 14 in the final food item tended to be greater than the weight preprinted on wrapper 82 to insure that all food items met or exceeded the preprinted weight even if cavities 24 were not filled. With more consistent filling of cavities 24, the amount of overage of food 14 can be reduced while still maintaining confidence that food 14 in the final food item meets or exceeds the preprinted weight on wrapper 82. In fact, saddle 36' according to the preferred teachings of the present invention can be utilized to reduce the amount of overage of food 14 even though food items including different foods 14a and 14b are not desired to be produced.

Although saddle 36' according to the teachings of the present invention has been explained in connection with the production of a food item including a continuous string of food 14 on a support 16, saddle 36' can have applications in the production of other food items where the food is fed into and between the nip of counter-rotating rollers. As examples, saddle 36' could be utilized in the production of the food item shown and disclosed in U.S. Pat. No. 5,516,542, which is hereby incorporated herein by reference. Similarly, saddle 36' could be utilized in the production of fruit-based snack products such as FRUIT ROLL-UPS™ fruit products.

In a further alternate embodiment of apparatus 10 according to the teachings of the present invention, a thin layer of edible oil such as high stability sunflower oil in the most preferred form is applied to film material 66 on the side opposite to roller 18 and after its removal from roll 68 and prior to its abutment with roller 18. The thin layer of edible oil provides more consistent and/or easier separation of film material 66 from support material 16 and food 14 after roller 74. Particularly, an edible oil applicator 160 is provided including first and second die bodies 162 and 164 between which is sandwiched a shim 166. In the preferred form, bolts 168 pass through body 162, then through shim 166, and are threaded in body 164 to secure bodies 162 and 164 together. The lower film engaging surface of body 162 includes a first planar face 170 adjacent body 164 and a second planar face 172 extending at an angle in the order of 160° and located on the opposite side of face 170 than body 164. A channel 174 is formed in the face of body 162 abutting with body 164 and has an axial width generally equal to or slightly longer than the axial extent of the pattern on forming roller 18. Channels 174 are provided in body 162 in equal number and at corresponding axial positions to the plurality of patterns included on forming roller 18, with four being shown. Each of the channels 174 includes a feed port 176 extending from channel 174 to an exposed, exterior face of body 162.

Edible oil is provided under pressure from a source 178 such as by a pump 180 to each of ports 176 of body 162 in fluid communication with channels 174. In the most preferred form, a manually operated valve 182 is provided between pump 180 and each port 176 to adjust the flow rate of edible oil to channels 174 and relative to the flow rate of the other channels 174.

Shim 166 is generally planar for flushly abutting with the respective faces of bodies 162 and 164. Shim 166 includes a plurality of axially spaced cut-outs 184. Cut-outs 184 have an axial extent generally equal to the axial extent of channels 174 and extend from face 170 to an extent equal to the maximum extent of channels 174. Cut-outs 184 are provided in shim 166 in equal number and at corresponding axial positions to channels 174 in body 162.

The lower surface of body 164 includes a first, planar, film engaging portion 186 located in the same plane as face 170 but separated and spaced therefrom by shim 166. The lower surface of body 164 further includes a second, planar portion 188 spaced from film material 66 and portion 186 and a third, semicylindrical portion 190 extending in a concave manner in body 164 between portions 186 and 188. The length of portion 186 in the movement direction of film material 66 is relatively short and considerably smaller than the length of portion 188 or of face 170. Specifically, in the preferred form, portion 186 has a length in the order of 15% that of portion 188 and in the order of 25% that of face 170.

In operation of apparatus 10 including oil applicator 160 according to the preferred teachings of the present invention, a thin layer of edible oil is applied on film material 66 before its entry into mating side 32 in a plurality of axially spaced strips corresponding to the axially spaced patterns of roller 18. Specifically, while film material 66 passes from roll 68, pump 180 removes oil from source 178 and supplies it under pressure to each of channels 174 at the rate controlled by valves 182. Oil flows from channels 174 into ducts defined by cut-outs 184 of shim 166 between the abutting faces of bodies 162 and 164, with the oil contacting film material 66 when it reaches the position in the ducts intermediate face 170 and portion 186. Oil is thereby applied to the surface of film material 66 as it passes over the faces 170 and 172 and portion 186 and within the axial width of cut-outs 184. It should be realized that due to the relatively short length of portion 186 and as the oil is under pressure in cut-outs 184 by pump 180, oil will tend to be forced to pass around the abutment defined in body 164 by portion 186 and will tend to flow into the recess in body 164 defined by portions 188 and 190 due to the movement of film material 66 in that direction. However, as portion 186 is in the same plane as face 170, the amount of oil which flows around the abutment defined in body 164 by portion 186 is minimized so that only a relatively thin layer of oil is applied on film material 66 in strips at positions and of widths corresponding to cut-outs 184, with the oil being generally uniformly applied axially across the strips on film material 66.

Various factors can affect the ability of film material 66 to be consistently and easily separated from support material 16 and food 14 after roller 74. Specifically, problems can exist that food 14 or portions thereof remain adhered, stick or are otherwise secured to film material 66. Thus, food 14 may be removed from support 16 rather than the desired result that film material 66 separates from food 14 and support material 16 and with food 14 remaining adhered to support material 16. Particularly, it is believed that ambient humidity has an impact on the ease and consistency of film material 66 separating from food 14 and support material 16. Additionally, as set forth previously, the use of saddle 36' provides more consistent filling of cavities 24. As a result, food 14 can be fed to mating side 32 under warmer conditions and in fact can be fed directly from extruder 54 to saddle 36' without passing food 14 through air impingement cooling tunnel 58. However, it can be appreciated that as food 14 is introduced into mating side 32 at higher temperatures, the process of operation of apparatus 10 must be changed. As an example, roller 18 can be cooled by circulating cold water having a temperature in the order of 50–55° F. (10–13° C.) so that roller 18 has a surface temperature in the order of 90° F. (32° C.). This change in operational temperatures is also believed to have an impact on the ease and consistency of film material 66 separating from food 14 and support material 16.

According to the preferred teachings of the present invention, the thin layer of edible oil on film material 66 reduces the tendency of food 14 to adhere, stick, or otherwise remain secured to film material 66 as film material 66 is separated from support material 16. Thus, film material 66 is more consistently and easily separated from food 14 and support material 16 after roller 74. It should be realized that the amount of oil utilized is minimized as it is applied only to the axial areas of film material 66 which is in contact with food 14 and is not applied in the axial areas between the patterns of roller 18. Additionally, the volume of oil applied can be adjusted by adjustment of valves 182 so that the minimum amount of oil is utilized according to the particular operational parameters. For example, less oil is needed with reduced ambient humidity such as during winter months.

In a still further alternate embodiment of apparatus 10 according to the preferred teachings of the present invention, the food item includes food 14 in the form of multiple continuous strings or ropes of material supported on support 16 such as shown in FIG. 14. Specifically, food 14 of FIG. 14 includes a first continuous string 14e shown in a preferred shape of a muscle type shirt and a second continuous string 14f shown in a preferred shape of shorts, with string 14f being removable from support 14 separately from string 14e. It should be appreciated that more than two strings 14e and 14f can be provided. Likewise, it can be appreciated that strings 14e and 14f can be arranged in other shapes such as but not limited to rockets, comets, and the like. In the most preferred form, each of strings 14e and 14f can be gradually peeled from support 16 while the other string 14e and 14f and the unpeeled portions remain adhered to support 16 to enhance the play value of the food item. However, it can be appreciated that the use of multiple strings 14e and 14f increases the number of potential arrangements of food 14 and the number of potential variations that the consumer can remove food 14 from support 16 to change the arrangement of food 14 as food 14 is being consumed.

Additionally, it should be appreciated that as the range density of strings 14e and 14f decreases on support 16, it is desirable to fill in the areas of support 16 between strings 14e and 14f for aesthetic reasons and so that the total weight of food 14 in the final food item was equal to (or greater than) the desired amount of food 14 desired to be retailed for standard sizes of support 16. Towards that end, interior lands 22 located between grooves 24 in each pattern include depressions 196 spaced inwardly from grooves 24 and thus of an axial width less than the axial width between grooves 24 and of a constant depth which is considerably less than the depth of grooves 24. In the most preferred form, depression 196 in roller 18 has a depth in the order of 0.060 inches (0.152 cm). Food 14 located in depression 196 will form an interior continuous flat strip 14c having a thickness generally equal to the depth of depression 196 and located between strings 14e and 14f such as shown in FIG. 14, with food 14 of strip 14c in about 1 square inch (6.45 cm$^2$) area weighing one gram. The spacing of depressions 196 from grooves 24 should be sufficient to minimize or prevent flashing by food between the peripheries of rollers 18, 20, and 21 intermediate grooves 24 and depressions 196 and being evidenced by a thin film on support material 16 between strings 14e and 14f and strips 14c. Such a thin film could prevent the individual peeling of strings 14e and 14f and strip 14c from support material 16.

Further, exterior lands 22 separating the patterns from each other on rollers 18 and 21 can include an annular depression 198 spaced outwardly from grooves 24 and of a width less than the spacing between the patterns and of a constant depth which is considerably less than the depth of groove 24 and in the most preferred form generally equal to the depth of depression 196. Food 14 located in depression 198 will form a continuous, flat, annular strip 14d located outwardly and/or between strings 14e and 14f such as shown in FIG. 14. The spacing of depressions 198 from grooves 24 should be sufficient to minimize or prevent flashing by food between the peripheries of rollers 18, 20, and 21 intermediate grooves 24 and depression 198 and being evidenced by a thin film on support material 16 between strings 14e and 14f and strip 14d. Such a thin film could prevent the individual peeling of strings 14e and 14f and strip 14d from support material 16.

Strips 14c and 14d can include voids to increase the aesthetics and play value of food 14. As an example, voids in the form of numbers could be added in strip 14c inside the interior of string 14e shown so that an athletic outfit is depicted. Further, it should be realized that although in the preferred form shown in FIG. 14 the outer periphery of strip 14d is of a rectangular configuration, strip 14d could include outer peripheries of other shapes. Likewise, although shown in FIG. 14 including both strips 14c and 14d, a food item can be fabricated including only one strip 14c or 14d.

It is believed that fabrication of the food item according to the preferred teachings of the present invention is advantageous over other fabrication techniques such as injection molding including at least due to continuous fabrication reasons resulting in reduced costs and greater capacities.

Likewise, although it is believed that the arrangement of food 14 as continuous strings in a serpentine and non-intersecting manner is advantageous at least due to the novelty and play value of the product, food 14 can have other arrangements such as but not limited to strings and strips in an intersecting manner or other shapes according to the preferred teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Food item comprising, in combination: a support formed of a generally rigid material and having a length, a width, and an upper surface; at least a first continuous string of food having an elongated length, a height, and first and second, opposite ends, with the continuous string of food being removably adhered to the upper surface of the support; at least a first continuous thin strip of food surrounding the string of food having a height which is considerably less than the height of the continuous string of food, with the continuous strip of food being removably adhered to the upper surface of the support separate and spaced from the continuous string of food.

2. The food item of claim 1 wherein the upper surface of the support includes an interior portion located between the at least first continuous string, with the continuous strip of food located in the interior portion of the upper surface of the support.

3. The food item of claim 2 further comprising, in combination: a second continuous strip of food, with the upper surface of the support including an exterior portion located outwardly of the at least first continuous string of food, with the second continuous strip of food located in the exterior portion of the upper surface of the support and defining an outer periphery for the food item.

4. The food item of claim 3 wherein the second continuous strip of food is annular.

5. The food item of claim 1 wherein the upper surface of the support includes an exterior portion located outwardly of the at least first continuous string of food, with the continuous strip of food located in the exterior portion of the upper surface of the support and defining an outer periphery for the food item.

6. The food item of claim 1 wherein the continuous strip of food and the continuous string of food are formed of homogeneous material.

* * * * *